United States Patent [19]

Srowig et al.

[11] Patent Number: 4,932,336
[45] Date of Patent: Jun. 12, 1990

[54] METHOD OF AND APPARATUS FOR DISPOSING OF WASTES FROM WASTEPAPER RECYCLING

[75] Inventors: Norbert Srowig, Essen; Gerhard Golkowski, Willich; Wilhelm Lutterbach, Mülheim, all of Fed. Rep. of Germany

[73] Assignee: Oschatz GmbH, Essen, Fed. Rep. of Germany

[21] Appl. No.: 413,530

[22] Filed: Sep. 27, 1989

[30] Foreign Application Priority Data

Sep. 2, 1989 [DE] Fed. Rep. of Germany ....... 3929235

[51] Int. Cl.$^5$ ............................................. F23G 7/04
[52] U.S. Cl. ................................. 110/346; 110/221; 110/234; 110/235; 110/238
[58] Field of Search ............... 110/238, 346, 233, 234, 110/221, 224, 235

[56] References Cited

U.S. PATENT DOCUMENTS 3,722,433 3/1973 Kramer ............................... 110/238
3,954,069 5/1976 Loken ............................. 110/346 X

FOREIGN PATENT DOCUMENTS 1146813 5/1983 Canada ............................... 110/221
0100222 8/1981 Japan ................................. 110/221

Primary Examiner—Edward G. Favors
Attorney, Agent, or Firm—Herbert Dubno

[57] ABSTRACT

To dispose of a dewatered collected product consisting predominantly of cellulosic materials in a solids phase and a residue consisting predominantly of plastics in wastepaper recycling, the collected product is dried to at most 25% weight percent moisture content as based upon the solids and is then layered onto an oscillating grate. The residue is applied as a second layer on the first layer and the resulting two-layer bed is burned on the grate with bottom-blowing with slag formation and collection. The heat content of the combustion gas can in part be recovered by the generation of steam.

23 Claims, 1 Drawing Sheet

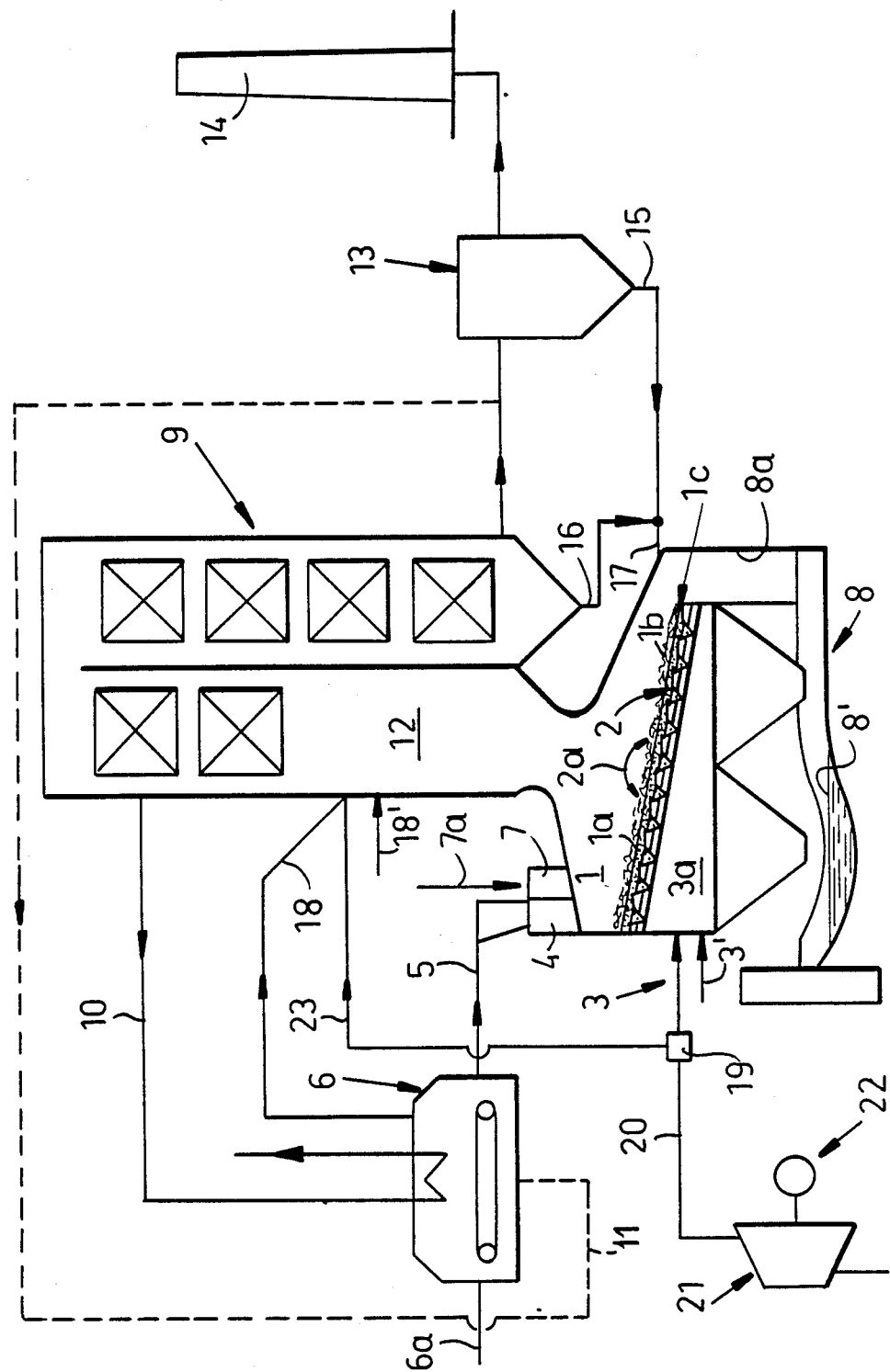

METHOD OF AND APPARATUS FOR DISPOSING OF WASTES FROM WASTEPAPER RECYCLING

FIELD OF THE INVENTION

Our present invention relates to a method of and to an apparatus for the disposal of wastes arising in wastepaper recycling in the paper and cardboard industry.

BACKGROUND OF THE INVENTION

In wastepaper recycling, the raw material, namely, the scrap paper fibers, tend to become damaged during the recycling treatments. A paper fiber can be used some four to six times before it breaks and becomes unusable As a consequence of such breakage, the production water used in the recycling of wastepaper becomes enriched in fiber particles and, in the process, the fiber particles are collected from the production water, e.g. by floatation and the collected material is dewatered to form a concentrate which consists predominantly of such particles which are wood and cellulose fibers and thus consists predominantly of cellulosic material This collected dewatered product is referred to herein as "the collected product."

In the wastepaper recycling process, moreover, there also arises a material which will be termed herein a "residue" and which consists predominantly of plastic particles or pieces. This residue present in the original scrap paper is separated out prior to the waste paper processing and may be in the form of adhesive tapes or strips, plastic foils and the like. Indeed, such residues generally consist of more than 95% by weight of plastic pieces and are directly separated from the recycling process and generally must be disposed of independently from the collected product described above The residue is also termed the "reject" in the trade.

In the past, the collected product, dewatered to a dry solids content of about 35%, is disposed of in a landfill. The residue is likewise generally disposed of in a landfill independently from the collected product.

If one appreciates that about 10% of the scrap paper at the start of wastepaper recycling is in the form of the collected product and the residue and that the weight proportion of the collected product to the residue is about 9:1, it should be immediately apparent that, for ecological reasons, wastepaper recycling, although laudable in enabling reuse of a high-bulk material, poses a significant danger to landfill capacities.

As a consequence, as ecological forces in society increasingly promote wastepaper recycling, there is created a substantial challenge to existing landfill capacities which are rapidly being depleted Consequently, it should be clear that another approach to the disposal of the collected product and the residue, as defined above, from wastepaper recycling is essential.

OBJECTS OF THE INVENTION

It is the principal object of this invention to provide an improved method of disposing of the collected product and residue so as to minimize or eliminate the landfill depletion problem discussed above.

Another object of the invention is to provide an improved apparatus for the disposal of the collected product and residue, as defined above, of wastepaper recycling.

It is an object of this invention to provide an improved method of and apparatus for the disposal of residual wastes from wastepaper recycling which will not provoke an environmental challenge.

SUMMARY OF THE INVENTION

These objects and others which will become apparent are attained, in accordance with the present invention, in a method whereby the dewatered collected product is dried to a residual water content, in terms of the collected product, which is at most 25% by weight, is thereafter continuously layered upon a grate of a combustion furnace, the residue is overlayered onto this product and the resulting bed is burned with bottom-blowing to form a slag which is collected.

The invention is based upon our discovery that a predewatered collected product after further drying can be burned without the use of a separate fuel source or so-called primary energy, together with the residue in a highly economical manner when the combustion takes place in a bed formed by the two layers, provided that the lower layer is the collected product and the upper layer is the residue.

The resulting slag has been found to be useful directly as a structural material and need not be disposed of in a landfill. However, even if the slag is allowed to harden and is disposed of in a landfill, the volume of this material is a small fraction of the volume of the collected product and the residue prior to this process.

The method of the invention thus comprises the steps of:

(a) separately recovering from a wastepaper recycling process a wet dewatered collected product of solids consisting predominantly of cellulosic material and a residue consisting predominantly of plastic pieces separated from waste paper prior to recycling treatment;

(b) drying the collected product to a residual water content of at most 25% by weight of the collected product;

(c) continuously layering the collected product dried in step (b) to form a continuously advancing layer thereof;

(d) depositing upon the layer of the collected product dried in step (b), a layer of the residue to form a continuously advancing two-layer bed; and (e) burning the continuously advancing two-layer bed while subjecting same to bottom blowing with an air-containing gas to substantially destroy the collected product and the residue while recovering a slag from the resulting combustion and producing a combustion gas.

According to a feature of the invention, the combustion gases which are produced by the burning of the two-layer bed contains sensible heat which can be recovered, especially for steam generation. This allows utilization of the combustion heat as well.

Preferably, the predewatered collected product is dried to a residual water content of 20% by weight of the collected product. The process in that case is not as sensitive to the contribution to the combustion by exothermic heat from the combustion of the residue.

The generated steam can be used in the production of paper. It also can be employed, in accordance with a preferred embodiment of the invention for drying the dewatered collected product. If desired, a portion of the steam can be used for this purpose while another portion can be employed for predrying the collected product.

According to a feature of the invention which can be used in combination with the preceding feature, all or part of the combustion gas can be used to dry the collected product.

The possible problem of dealing with waste air produced in the drying process can be eliminated if this waste air is used to after-burn combustibles remaining in the combustion gas following the combustion of the collected product and residue.

The uniform-thickness residue layer can correspond to up to 100% by weight of the solids of the collected product on which it is layered. Best results, however, are obtained when the uniform-thickness dried and layered collected product is covered by at most 15% by weight of the residue in terms of the solids content of the collected product.

According to another feature of the invention, a dedusting of the combustion gas is effected and fly ash recovered therefrom is returned to the slag to be trapped therein. This slag can be used directly as a building material, e.g. for the formation of building blocks, so that no landfill disposal problem is created.

In the production of paper and cardboard, electrical energy is generated which frequently is produced by an electrical-current-generating gas turbine whose hot exhaust gas still contains significant quantities of oxygen (up to 15 volume percent). In this case, we have found it to be advantageous to use as the blowing gas at least in part the exhaust gas of the current-generating gas turbine, especially if that gas turbine is driven with a hydrocarbon fuel, e.g. combustion of a natural gas and air mixture.

The exhaust gas from the turbine can be replaced in whole or in part by oxygen before it enters the plenum below the grate to act as the blowing gas. Any portion of the exhaust gas from the gas turbine which is not utilized for bottom-blowing of the composite process can be fed to the afterburner to burn combustibles in the combustion gas and to contribute to the combustion gas, ultimately for stem generation, for example, in sensible heat or combustion heat which can be utilized.

In an embodiment in which an after-burning is provided, the proportion of the exhaust gas from the turbine which is not used for bottom-blowing can be fed to the afterburner as secondary air for the combustion.

In its apparatus aspects, the invention comprises:
- means for separately recovering from a wastepaper recycling process a wet dewatered collected product of solids consisting predominantly of cellulosic material and a residue consisting predominantly of plastic pieces separated from waste paper prior to recycling treatment;
- means for drying the collected product to a residual water content of at most 25% by weight of the collected product;
- means for continuously layering the dried collected product to form a continuously advancing layer thereof;
- means for depositing upon the layer of the collected product, a layer of the residue to form a continuously advancing two-layer bed; and
- means for burning the continuously advancing two-layer bed while subjecting same to bottom blowing with an air-containing gas to substantially destroy the collected product and the residue while recovering a slag from the resulting combustion and producing a combustion gas.

In specific terms a combustion furnace is formed with an oscillating grate inclined downwardly in a direction of advance of the bed, the means for drying the collected product includes a drier upstream of the grate, the means for continuously layering the dried collected product includes a transport device for the dried collected product connected to the drier and a metering device connected to the transport device for depositing the dried collected product on the grate, the means for depositing the residue includes another metering device located downstream of the first-mentioned metering device and depositing the residue upon the grate, and the apparatus further comprises a slag collector disposed below the grate.

The inclined oscillating or vibrating grate has been found to provide a highly effective combustion of the two-layer bed without causing the residue layer to mix with the collected product layer and without reaching the grate itself during the process.

Advantageously, downstream of the furnace in the path of the combustion gas, is a heat-recovery unit, especially a steam generator. The latter can be connected with the drier.

In addition, a combustion-gas branch duct can be provided so that sensible heat of the combustion gas can be delivered to the drier for drying the collected product.

The waste air outlet of the drier is connected to the after-burner chamber of the furnace A fly ash collector, e.g. a filter, cyclone or the like can have its outlet connected with the furnace in the region of the slag collector so that the fly ash is ultimately trapped in the slag and does not require separate disposal.

The waste-gas line from the gas turbine of the current generator is provided with a proportioning control, e.g. a distributing valve, which can send some of that waste air to the aforementioned plenum while another portion is sent to the after-burner.

BRIEF DESCRIPTION OF THE DRAWING

The above and other objects, features and advantages of the present invention will become more readily apparent from the following description, reference being made to the accompanying drawing the sole FIG. of which is a flow diagram illustrating the apparatus of the invention and the process.

SPECIFIC DESCRIPTION

The drawing illustrates diagrammatically an apparatus for disposing of the collected product on the one hand and the residue on the other hand as separately recovered in wastepaper recycling in the paper and cardboard industry.

The dewatered collected product is introduced at 6a and the residue is introduced at 7a to the process. The dewatered collected product and the residue have both been defined above.

The apparatus basically comprises a combustion furnace 1 with an inclined vibrating or oscillating grate 2 and a plenum 3a below the grate 2 which allows bottom-blowing of the combustion process through the grate. The bottom-blowing gas is introduced at 3 or 3'. The oscillation of the grate is represented by the arrow 2a.

Above the upper end of the grate, a metering device 4 is provided for the collected product which is supplied to the metering device via a transport device 5 from a drier 6.

As has been indicated, the predewatered collected product is supplied to the drier 6 and can be continuously dried therein to form the dried collected product, which, in turn, is supplied via transport device 5 to the metering device 4, the latter forming an initial layer 1a upon the grate. The second layer, i.e. the layer 1b of the residue is supplied by another metering device 7 downstream of the metering device 4 in the path of the grate. The two layers 1a and 1b form a combustible bed represented at 1c on the grate which is subjected to burning.

Below the oscillating grate 1, a slag collector 8 is provided.

Downstream of the furnace, along the path of the combustion gases produced during the combustion process, is a steam generator 9, i.e. a unit in which water is passed in indirect heat-exchange to the combustion gases and converted into steam.

The steam generator is connected by a line shown diagrammatically at 10 with the drier 6 so that at least a portion of this steam can be used to dry the dewatered collected product in the drier 6.

In addition, the combustion furnace 1 has downstream of the steam generator in the flow path of the combustion gases, a branch line 11 for the combustion gases which can deliver a portion of the combustion gas, if desired, to the drier 6 to assist in drying the collected product therein.

The combustion gas path is further provided with an after-burner chamber 12 in which residual combustibles in the combustion gas can be burned off. Such combustibles can include carbon monoxide and the after burner can thus reduce the carbon dioxide content of the combustion gas.

Primary air for the after-burning can be supplied at 18'.

Secondary air for the after-burning can be delivered by a line 18 in the form of all air or a portion of the waste air from the drier 6.

Downstream of the steam generator 9 along the path of the combustion gas is a dry-dust separator 13, e.g. a cyclone or filter and a stack 14.

The dust separator 13 has its outlet 15 connected to a furnace in a region in which the dust can pass into the slag collector, e.g. in the slag zone of the furnace. The outlet 16 from the steam generator 9 likewise delivers any settled fly ash to the duct 17 which discharges the fly ash into the furnace.

The duct 17 can introduce fly ash together with secondary combustion air into the furnace in the slagging zone.

The bottom-blowing inlet 3 is connected by a proportioning device 19 with an exhaust-gas line 20 from a gas turbine 21 which drives an electric current generator 22 and is driven, in turn, by a natural-gas or firing mixture for this gas turbine.

The proportioning device 19 can also deliver some of the exhaust gas from the gas turbine to the afterburner chamber 12 via the branch line 23.

The function of the apparatus generally should be apparent from the drawing as well. The predewatered collected product is dried in drier 6 to a residual water content in terms of a solids content of 25% by weight and preferably to 20% by weight. This drying can be effected by heating with at least a portion of the generated steam and/or by direct heating with combustion gas produced upon combustion of the collected product and residue A waste air generated in the drier, and containing sufficient oxygen to sustain combustion, is introduced into the afterburner chamber and used to after-burn the combustion gases.

With the aid of the metering device 4, the dried-collected product is continuously layered on the oscillating grate (see layer 1a) and directly thereover, the residue layer is formed so that it is present in an amount in at most 100% by weight, preferably at most 15% by weight of the solids content of the collected product.

The resulting two-layer bed is burned with bottom-blowing so that a slag 8' is formed and is collected. This slag tends to be delivered over the right-hand end of the grate into the shaft 8a to pass into the collector 8. The fly ash dumped into the shaft 8a via the duct 17 is thus trapped in the slag.

The liquid slag can harden upon cooling for use in the construction industry, e.g. by casting into blocks.

The bottom-blast is supplied in part by the exhaust gas from the gas turbine 21 and member 19 provides control of the proportion delivered as the bottom-blast and the proportion fed via line 23 to the afterburner 12.

The exhaust gas can be enriched with oxygen although any additional oxygen needs can be supplied separately as represented by the arrow 3'. At both 3' and 18', ordinary air can be used.

WE CLAIM:

1. A method of disposing of wastes from wastepaper recycling in the paper and cardboard industry, comprising the steps of:
    (a) separately recovering from a wastepaper recycling process a wet dewatered collected product of solids consisting predominantly of cellulosic material and a residue consisting predominantly of plastic pieces separated from waste paper prior to recycling treatment;
    (b) drying said collected product to a residual water content of at most 25% by weight of the collected product;
    (c) continuously layering the collected product dried in step (b) to form a continuously advancing layer thereof;
    (d) depositing upon said layer of the collected product dried in step (b), a layer of said residue to form a continuously advancing two-layer bed; and
    (e) burning said continuously advancing two-layer bed while subjecting same to bottom blowing with an air-containing gas to substantially destroy said collected product and said residue while recovering a slag from the resulting combustion and producing a combustion gas.

2. The method defined in claim 1, further comprising the step of recovering heat from said combustion gas and producing steam with the recovered heat.

3. The method defined in claim 2 wherein said dewatered collected product is dried in step (b) to a residual water content of 20% by weight with respect to the solids content thereof.

4. The method defined in claim 3 wherein said dewatered collected product is dried at least in part by said steam.

5. The method defined in claim 3 wherein said dewatered collected product is dried at least in part by said combustion gas.

6. The method defined in claim 5 wherein a waste air is produced in drying said collected product, said method further comprising the step of afterburning said combustion gas with said waste air.

7. The method defined in claim 1 wherein said residue is deposited on said layer of the collected product dried in step (b) in an amount which at a maximum is 100% by weight of the collected product and 15% by weight of the solids content of the collected product.

8. The method defined in claim 1 wherein a fly ash is produced in the combustion in step (e), further comprising the step of trapping said fly ash in said slag.

9. The method defined in claim 1, further comprising the step of recovering said slag as a building material.

10. The method defined in claim 1 wherein the two-layer bed is bottom blown with an exhaust gas from an electricity-generating gas turbine.

11. The method defined in claim 10, further comprising the step of driving said turbine by combustion of a natural gas and air mixture.

12. The method defined in claim 10, further comprising the step of burning off combustibles in said combustion gas with a portion of said exhaust gas not used to bottom blow the combustion of said bed.

13. The method defined in claim 10, further comprising the step of burning off combustibles in said combustion gas, a portion of said exhaust gas not used to bottom blow the combustion of said bed being introduced as secondary air to the burning off of combustibles in said combustion gas.

14. An apparatus for disposing of wastes from wastepaper recycling in the paper and cardboard industry, comprising:
means for separately recovering from a wastepaper recycling process a wet dewatered collected product of solids consisting predominantly of cellulosic material and a residue consisting predominantly of plastic pieces separated from waste paper prior to recycling treatment;
means for drying said collected product to a residual water content of at most 25% by weight of the collected product;
means for continuously layering the dried collected product to form a continuously advancing layer thereof;
means for depositing upon said layer of the collected product, a layer of said residue to form a continuously advancing two-layer bed; and
means for burning said continuously advancing two-layer bed while subjecting same to bottom blowing with an air-containing gas to substantially destroy said collected product and said residue while recovering a slag from the resulting combustion and producing a combustion gas.

15. The apparatus defined in claim 14 wherein said means for burning said continuously advancing two-layer bed comprises a combustion furnace formed with an oscillating grate inclined downwardly in a direction of advance of said bed, said means for drying said collected product includes a drier upstream of said grate, said means for continuously layering the dried collected product includes a transport device for the dried collected product connected to said drier and a metering device connected to said transport device for depositing the dried collected product on said grate, said means for depositing said residue includes another metering device located downstream of the first-mentioned metering device and depositing said residue upon the grate, and said apparatus further comprises a slag collector disposed below said grate.

16. The apparatus defined in claim 15, further comprising a steam generator connected downstream of said furnace and generating steam from heat of combustion gas from said furnace.

17. The apparatus defined in claim 16 wherein said steam generator is connected with said drier for supplying steam thereto.

18. The apparatus defined in claim 15, further comprising a hot-gas duct connected to said furnace downstream of said grate in a combustion gas flow path for delivering combustion gas to said drier.

19. The apparatus defined in claim 15, further comprising an afterburner chamber formed in said furnace, and means connecting an outlet of said drier with said afterburner for afterburning combustion gas in said chamber with waste air from said drier.

20. The apparatus defined in claim 15, further comprising means for collecting fly ash from combustion gas formed in said furnace.

21. The apparatus defined in claim 20 wherein said means for collecting fly ash from the combustion gas opens into said furnace in a slag-forming region of said grate to trap said fly ash in said slag.

22. The apparatus defined in claim 15, further comprising a an electricity-generating gas turbine for generating gas flow through said grate, and a waste gas duct for supplying a bottom-blowing plenum of said furnace below said grate with waste gas from said gas turbine.

23. The apparatus defined in claim 22 wherein said duct has a branch delivering a portion of said waste gas to an afterburner for said combustion gas, further comprising a control element regulating the proportions of said waste gas sent to said plenum and said afterburner.

* * * * *